United States Patent
Benson

[11] 3,757,379
[45] Sept. 11, 1973

[54] WINDSHIELD CLEANING APPARATUS

[76] Inventor: Robert D. Benson, 2521 Cedar St., White Bear, Minn. 55110

[22] Filed: Mar. 13, 1972

[21] Appl. No.: 234,270

[52] U.S. Cl............................. 15/250.04, 15/250.42
[51] Int. Cl. ............................................. B60s 1/48
[58] Field of Search.................... 15/250.01, 250.02, 15/250.03, 250.04, 250.42

[56] References Cited
UNITED STATES PATENTS

| 2,059,224 | 11/1936 | French............................ | 15/250.04 |
| 2,910,715 | 11/1959 | Ohrt................................ | 15/250.04 |

FOREIGN PATENTS OR APPLICATIONS

| 544,311 | 1/1956 | Belgium........................... | 15/250.04 |
| 526,743 | 1/1956 | Canada............................ | 15/250.04 |
| 462,642 | 10/1968 | Switzerland..................... | 15/250.04 |

Primary Examiner—Peter Feldman
Attorney—Robert C. Baker

[57] ABSTRACT

This new windshield cleaning apparatus is employed in an environment comprising an elongated wiper blade, and a wiper blade supporting assembly including an arched yoke structure connected to an oscillating wiper arm. The apparatus includes a windshield spraying washer, means for mounting the washer for oscillation with the blade supporting assembly, and flexible conduit means connecting the washer to a source of washing liquid. The windshiled spraying washer consists essentially of a resiliently flexible plastic tube which is arched comparably to the arching of the yoke structure of the blade supporting assembly. An inverted U-clip is attached to each end of the plastic tube, preferably as a unitary or integral appendage thereto. Each U-clip is removably clip-attached to the yoke structure to hold the arched tube in a substantially parallel laterally juxtaposed relationship to the yoke structure, for flexing therewith. Apertures in the tube direct wash fluid toward the windshield as oscillation and flexing of the entire assembly takes place.

9 Claims, 4 Drawing Figures

PATENTED SEP 1 1 1973  3,757,379

WINDSHIELD CLEANING APPARATUS

This invention relates to windshield cleaning apparatus, and more particularly to a new and improved windshield spraying washer and means for mounting the same for oscillation with a wiper blade supporting assembly.

Teachings of the invention may be used for the cleaning of the windshields of any standard vehicle. They are especially important in connection with the cleaning of the windshields of trucks and other large or expensive vehicles which generally are desired to be kept in motion for lengthy periods, but, for safety reasons, should have windshield cleaning apparatus which functions reliably under tremendous variations of speed, weather and adverse highway conditions. Unfortunately, conventional single spray washing jets as popularly employed (at the cowl of the windshield) for washing vehicle windshields are too frequently found to be unreliable in squirting the washing liquid upon the desired vision area of the windshield. They may function well at slow speeds, or sometimes at high speeds, but not reliably at both.

Many proposals have heretofore been advanced for the cleaning of vehicle windshields during movement down a highway; for example, see the following U. S. Pat. Nos.: 1,647,319 Shults; 1,655,266 Gustafson; 1,919,236 Lusford; 2,632,911 Deibel; 2,648,865 Gordon et al.; 2,714,739 Neufeld; 2,866,996 Krusche; 2,910,715 Ohrt; 2,918,689 Pruett; 2,925,617 Williams; 3,005,222 Webb; 3,008,170 Marks; 3,171,154 Levell; 3,192,550 Ziegler; 3,418,676 Byczkowski et al.

Unfortunately, no solution heretofore proposed, in so far as is known, has ever provided a truly simple, economical and effective windshield spraying washer easily and quickly attached to (or removed from) the yoke structure of a wiper blade supporting assembly to oscillate therewith and remain reliably attached thereto during such oscillation.

All know prior art teachings which have proposed solutions involving a removable oscillating washer device have also universally avoided the yoke structure as a point or base for removable attachment of it. The base for removable attachment heretofore relied upon has either been the wiper arm (as where oscillatable single or duel spray nozzles have been proposed) or the wiper blade including the flexor strip portion of it (as where an oscillatable tube washer parallel with the wiper blade has been proposed).

A basic conceptual point of this invention is that the nature of a tubular oscillatable windshield spraying washer can itself influence the effectiveness and functional performance of the means for attachment of it. This new conceptual realization makes it possible, for the first time insofar as is known, to reliably employ the yoke structure of an oscillating wiper blade supporting assembly as the base for removable attachment of a windshield washer of the tubular type, that is, one having plural apertures for directing washing fluid out along a line which is substantially parallel but laterally juxtaposed to an oscillating wiper blade.

A yoke structure represents an advantageous base for attachment because of its exposed character. It is readily accessible even to an unskilled person. No special tool is required to find it, nor to make it accessible for fixing an attachment clip on it. (Whereas, when an attachment clip is fixed on a wiper blade per se, or upon its backing or flexor strip portion, provision must first be made to withdraw the yoke structure sufficiently from that total blade structure to permit access to it).

But the very nature of the yoke structure of a wiper assembly militates against selecting it as a point or base for attachment. It changes in contour as it flexes in a plane perpendicular to a windshield during oscillation. Any two spaced points along the length of the yoke structure will vary in their linear direct-line distance or spacing as the yoke flexes in the aforenoted plane (and the change is further magnified in the case of a curved windshield, which is and has been for years the most common). Thus, the normally desired stability of relationships is lacking between two points along a yoke structure.

By practicing the teachings herein, however, such objections to the inherent characteristics of a yoke structure as a base for attachment of a tubular plural-spray windshield washer are overcome and indeed turned to advantage. This is accomplished by employing a resiliently flexible tubular windshield spraying washer which is of arched character, and which is so mounted to the yoke structure as to flex and change its arc of curvature in a plane perpendicular to the windshield in response to flexing of the yoke structure in that plane during oscillation. The flexing of the arched washer causes changes in its arc of curvature substantially accomodating all changes of longitudinal distance between the attachment points for the tubular washer on the yoke structure as it flexes during oscillation. Attachment clips holding the arched tubular washer on the yoke structure are not subject to any substantial slide action or shifting action during yoke flexing and the resulting change of distance between them. They remain firmly in position on the yoke structure; and it is the arching of the tubular washer itself which contributes to this result. This new approach significantly accounts for the successful operation of the new removably attached tubular washer hereof as distinguished from straight ones of the prior art.

Another problem solved in an astonishingly simplified manner by this invention (that is, simplified when looked at retrospectively) is that of the positioning of a flexible conduit for feeding washing fluid from a conventional windshield washing spray jet at the cowl of the automobile to the yoke-mounted oscillating washer device of this invention. A flexible conduit is connected to a conventional washing fluid spray jet nozzle as commonly located at the cowl portion (or portion of the automobile at the base of the windshield). It is fixed by ties or the like to the wiper arm; and thus, it is not free to flop around during oscillation of the windshield cleaning apparatus.

Further, the feeding of the washing fluid from the flexible conduit into the arched tubular washer is accomplished at a mid point along the length of the arched tubular washer, which facilitates the ability to fix the flexible conduit substantially in parallel relationship to the oscillating wiper arm almost from the very point of its connection to the arched tubular washer structure. The complete arrangement is such that the entire oscillating assembly performs substantially without creating unwanted distractions or problems for the driver. Of additional significance is the fact that the arrangement is not readily susceptible to fouling by adverse weather, such as a snow build-up at the cowl portion.

Additional benefits of the invention and details of it will further be described by reference to a drawing, made a part hereof, wherein.

Figure 2:
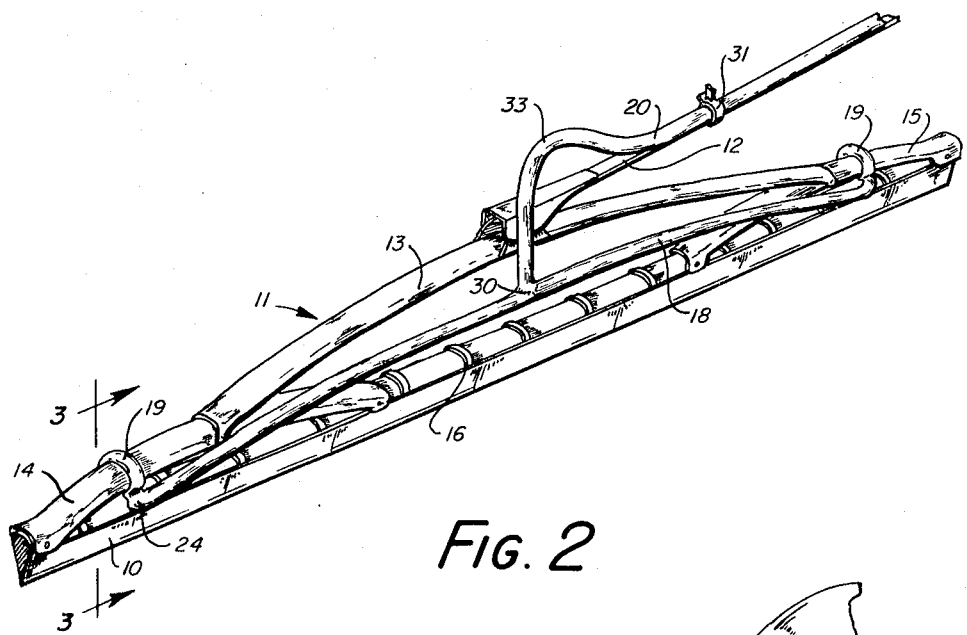
FIG. 2 is a enlarged schematic perspective view of the main portion of the windshield cleaning apparatus in FIG. 1.
Figure 1:
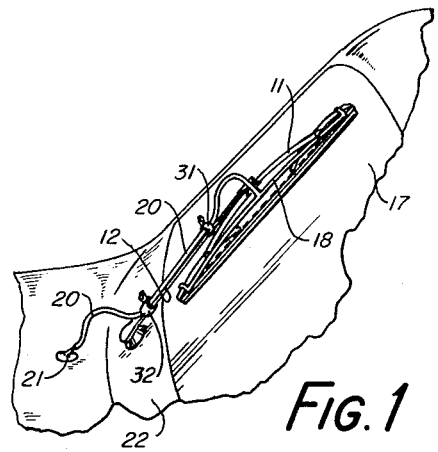
FIG. 1 is a schematic perspective view of a fragment of a windshield of a vehicle showing windshield cleaning apparatus of the invention.

Referring to the drawing, the universal basic elements of the cleaning apparatus (that is, the basic elements constituting the environment for specific improvements of this invention) comprise an elongated wiper blade 10 for wiping the windshield 17 and a wiper blade supporting assembly 11. The wiper blade supporting assembly 11 includes or consists of a plural yoke structure 11; and this yoke structure is connected to an oscillatable wiper arm 12. The yoke structure 11 generally consists of a plurality of interconnected yokes. A major or primary yoke 13 member is attached to the wiper arm, and subordinate or secondary yoke structures 14 and 15 are fastened to the frame of the wiper blade 10. The frame of the wiper blade many times will include flexor portions or flexor strips 16, which assist in holding the flexible rubber-like blade 10 in intimate contact upon the surface of a windshield 17 during oscillation of the wiper blade 10 even though the windshield 17 may be curved, as is most common.

A characteristic of the plural yoke structure 11 is that it is arched in a plane substantially perpendicular to the windshield 17. From the standpoint of identification, the surface of the plural yoke structure 11 most remote from the windshield 17 is identified herein as the dorsal side of the yoke structure. The outermost dorsal surface of the yoke elements 13, 14, and 15 are exposed (and these exposed areas are to be distinguished from the secondary yoke outer surfaces which lie under the primary yoke).

The wiper blade 10, its flexor strip 16, and the blade supporting assembly, which includes the plural yoke structure 11, are all flexible in a plane perpendicular to the surface of the windshield.

(To be recognized is that, as the wiper arm 12 oscillates in a plane substantially parallel to a tangent of a curved windshield, the yoke structure 11 flexes in a plane substantially perpendicular to the windshield. Thus, it moves toward and away from the surface of the windshield, with the result that the arc of curvature of both the primary 13 and secondary yokes 14 and 15 will vary greatly, sometimes even being substantially flattened. This in turn causes the linear or straight line distance between any two points on the total yoke structure 11 to vary depending upon the particular location selected for the spaced points.)

Additional basic parts included in the cleaning apparatus are a windshield spraying washer 18, plus means for mounting this washer 18 for oscillation with the blade supporting assembly 11. Specifically, the means 19 mounting the washer 18 for oscillation with the blade supporting assembly 11 serve to coact with the yoke structure 11 of the apparatus.

Flexible conduit means 20 connects the windshield spraying washer 18 to a source of washing liquid for feeding washing liquid to the washer. This flexible conduit means 18 may be connected (if desired, through any suitable adaptor fitting) to the outlet spray jet 21 conventionally located in the rear part of the hood or at the cowl base 22 for the windshield 17. A simple "press-on" friction connection is suitable. Intermittently squirted washing fluid from outlet 21 is entirely satisfactory as the washing liquid source. Of course, conduit 18 may be connected to the hose feeding standard outlet 21, or to any other suitable source for washing fluid.

An important feature of the invention is that of the improvement wherein the windshield spraying washer 18 and the mounting means 19 for the washer consist of a single unitary structure in the form of a resiliently flexible rod-like plastic member. In other words, it is especially desired to incorporate each mounting means 19 for the plastic resiliently flexible tube washer 18 as an integral unitary part of the tube washer 18, so that the mounting means or clip members 19 cannot slip or slide linearly along the washer 18 during operation of the apparatus.

Under all circumstances, however, the mounting clips employed for the washer 18 must support that tube washer 18, and in addition, serve as U-clips or fasteners for removable clip attachment to the plural yoke structure 11 over the dorsal side thereof. Therefore, where the mounting clips for the practice of this invention are not per se unitary with the material of the tubular washer 18, they should at least be attached to it in such a way as to behave substantially as though they were part of the material of it. They should not be loosely attached to permit sliding action of the tube washer 18 with respect to them.

By far the major benefits of the invention are achieved when the tubular windshield spraying washer and the mounting means for it consist of a single unitary structure, as aforenoted. This unitary structure is in the form of a resiliently flexible rod-like plastic member, suitably of polyamide plastic such as nylon, or polyvinyl-type plastic, or any other organic plastic of relatively stiff but resiliently flexible nature permitting the flexing characteristics hereinafter discussed. The rod-like member is characterized by the fact that each end portion thereof is an inverted U-clip 19 and forms the mounting means for the washer. It is also characterized by the fact that the portion of the rod-like member intermediate the U-clip portions 19 is tubular and forms the washer element 18 per se.

The tubular portion 18 is arched in an arc of a diameter greater than about 1 foot (preferably greater than about 2 feet) and less than about 20 feet (preferably less than about 10 or even 5 feet). The inner diameter surface of this arched tubular portion 18 is identified as the ventral side thereof; and outer diameter surface is identified as the dorsal side thereof.

Each U-clip portion of this unitary rod member consists essentially of a specially shaped arrangement of the rod-like member at the terminus of the tubular intermediate portion 18. The U-clip portions may be formed by shaping a continuation of the tube 18, or by fusing plastic U-clips to the ends of a tube 18. At least the very end of the total unitary rod-like member should be fused together to terminate the hollow interior of the tube 18; and it is suitable to employ an entirely solid plastic mass as the U-clip portions.

Figure 3:
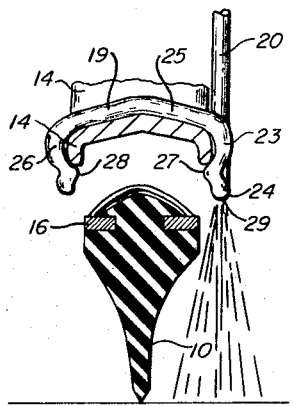
FIG. 3 is a schematic cross-sectional view taken on line 3—3 of FIG. 2 (with background detail broken away and omitted for clarity of view)
Figure 4:
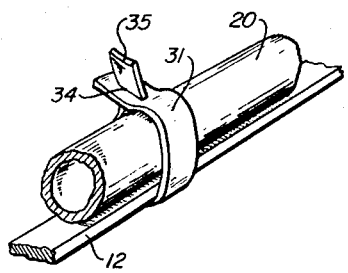
FIG. 4 is an enlarged perspective view of a suitable tie member for fixing a flexible conduit for the washer to the wiper arm of a windshield wiper.

The nature of the U-clips and their relationship to tube portion 18 in the unitary rod-like member is explained by reference to the dorsal and ventral orientation given for the arc of tube 18. A dorsally directed stretch 23 (see FIG. 3) of the rod-like member projects from the terminus 24 of the tubular intermediate portion 18. Then, a laterally directed stretch 25 of the rod-like member extends from the most dorsally extending part of that dorsally directed stretch 23. Further, a ventrally directed stretch 26 of the rod-like member extends from the most laterally extending part of the laterally directed stretch 25. Both clips are comprised of analogous parts. The laterally directed stretches of each of these U-clip portions 19 extends laterally from or off the same side of the tubular intermediate portion 18. To be recognized is that the dorsally-directed stretch 23 and the ventrally directed stretch 26 form opposing legs 23 and 26. These opposing legs are characteristic of each U-clip portion 19. The opposing legs serve as pinching members. They are suitably and desirably provided with slight knob-like projections 27 and 28 distally spaced from the laterally extending part 25; and these knobs or internal bends 27 and 28 of the rod-like member are in opposing relationship to each other on the interior portion of the U-clip legs 23 and 26. The most ventral portion of legs 23 and 26 (that is, the lowermost portion in FIG. 3) should flair outwardly or away from each other to facilitate removable clip attachment of the U-clips to the yoke 18 over the dorsal side thereof.

Each U-clip portion is removably clip attached over the plural yoke structure in the manner illustrated in the drawing. Knobs 27 and 28, after the U-clip is mounted on the yoke, tend to lodge under the side flange or depending edge flanges of the yoke, and thereby contribute to a "locking" action of the U-clip parts on the yoke. Each clip 19 therefore holds the arched tubular intermediate portion 18 in a substantially parallel but laterally juxtaposed relationship to the plural yoke structure 11. Further, the central part of the arched tubular portion 18 is elevated from the windshield with respect to the terminal ends thereof. This arching and elevation of tube 18 preferably approximates the medial arching and elevation of the yoke structure from the windshield; and it accommodates the flexing action by the yoke structure in a plane perpendicular to the windshield as oscillation of the supporting assembly takes place. However, the elevation (within the limits of the aforespecified arc of curvature for tube portion 18) may be either more or less that of the maximum or medial (or even the minimum) elevation for the yoke structure in flexing. Further, to be noted is that the arc flexing of tube 18 may frequently be in a reverse direction to the arc flexing of yoke 11; but tube 18 flexing always is in response to and accommodates yoke 11 flexing.

In essence, the change of linear dimension between any two spaced points of attachment for the composite rod-like member upon a yoke structure will cause the tubular intermediate portion 18 to flex and thereby change its build-in or preformed arc of curvature in a plane substantially perpendicular to the surface of the windshield (instead of flexing in a plane parallel to the windshield or otherwise causing a flopping movement serving to distract a driver from his main attention). This flexing of the tubular portion 18 is in more or less direct response to the flexing of the plural yoke structure in the plane also perpendicular to the windshield during the oscillating action of the yoke or blade supporting assembly.

Upon the ventral side along the entire length of the tubular intermediate portion 18 are located a plurality of spaced apertures 29 (see FIG. 3; not shown in other Figures) which direct or serve to direct the washing fluid fed to the tubular intermediate portion in a outward manner toward (and perpendicular to) the windshield at a position about adjacent the wiper blade during oscillation of the wiper blade and blade supporting assembly. Preferably, the aperatures are made progressively larger from the central smallest ones (located near the mid point or point of attachment of conduit 20 to tube 18) to the largest near the terminal ends of tubular portion 18, (that is, the ends near U-clips 19 and 20).

A mid-point or central location of connection for conduit 20 to tube 18 is highly significant. In essence, the connection for conduit 20 to tube 18 should be at a location other than at the end of tube 18, and preferably at an approximately central location along the length of the arc for tube 18. This aids in distributing washing liquid in proper quantity at the needed vision area of the windshield; but it also permits a more distraction-free relationship for conduit 20 to other elements and assists in maintaining the arc of curvature of tube 18 in the proper plane approximately perpendicular to the windshield.

As illustrated in FIG. 2, flexible conduit means 20 for washing fluid extends upwardly from a central location along the length of arched tube 18. The juncture 30 of conduit 20 to tube 18 preferably is a fused juncture or joining between the plastic of the conduit and the tube. Little likelihood exists for such a joint to work free during the oscillating motion of the unit. Thus, a fused joint is vastly preferred over a threaded coupling or the like.

The upward sweep of conduit 20 from tube 18 is followed by a curve of conduit 20 and positioning of it in alignment with (or substantially parallel with) wiper arm 12. It is held on arm 12 by suitable tie members 31 and 32 or other fastening means. The curved portion 33 of conduit 20 suitably is sufficiently loose from arm 12 and yoke 13 so as to permit a little "play" or free movement between that portion of the conduit and yoke 13, thereby to permit a downward flexing of tube 18 in response to an upward flexing of yoke 11. However, the amount of looseness or "play" needed is exaggerated in the drawing, and may be negligible where a single massive main yoke is present (and therefore where tube 18 flexing corresponds to yoke 11 flexing). Thus, curved part 33 of conduit 20 permissibly may substantially rest or lie upon the wiper arm 12 as conduit 20 extends to junction 30.

Preferred illustrative tie members 31 and 32 for holding conduit 20 on arm 12 suitably consist of a short flat band of thin flexible material, with a slit or hole or slot 34 near one end thereof. The band is wrapped about the arm 12 and conduit 20, and then the end 35 of the band opposite the slotted end is drawn through slot 34, and then pulled to tighten the band into a loop around the arm 12 and conduit 20. The band may be formed out of fabric sheets or plastic film or the like. Preferably the sheet material of the band is embossed or has a surface irregularity which introduces sufficient friction characteristics to the surface to cause the end 35 as drawn through slot 34 to resist dislodgement therefrom and to remain in that position by virtue of the frictional resistance of the surfaces of the band in contact with each other.

The teachings of the invention are useful in a variety of yoke structure arrangements, including yokes with spring mounted split parts (especially for the primary yoke), as well as those with essentially a single yoke, and those with a modified secondary yoke concealed by a massive primary yoke.

Only two points of clip attachment on the yoke structure are preferred, as this permits maximum cooperative flexing without causing substantial wear as from shippage or sliding of attachment clips. Resistance of clips 19 to sliding or slipping on yoke 11 suitably is enhanced by scoring or roughening the internal opposing surfaces of pinching legs 23 and 26. The organic plastic of the washer 18, and of the clips 19, as well as of conduit 20 (all suitably formed out of organic plastics such as nylon, polyvinyl chloride, even polyethylene, or any other organic plastic of suitable resiliently flexible character) causes no significant damage to any of the parts of conventional windshield cleaning assemblies.

That which is claimed is:

1. In a windshield cleaning apparatus comprising an elongated wiper blade for wiping the windshield, a wiper blade supporting assembly including a yoke structure connected to an oscillating wiper arm, said yoke structure being arched in a plane substantially perpendicular to the windshield, with the outer surface of said yoke structure most remote from said windshield being the exposed dorsal side thereof, both said wiper blade and said blade supporting assembly being flexible in said plane, a windshield spraying washer, means for mounting said washer for oscillation with said blade supporting assembly, and flexible conduit means connecting said washer to a source of washing liquid for feeding washing liquid to said washer, the improvements wherein said windshield spraying washer consists essentially of a resiliently flexible plastic tube and said mounting means for said washer consists essentially of an inverted U-clip attached to each end portion of said plastic tube, said plastic tube being arched in an arc of a diameter greater than about one foot and less than 20 feet, with the inner diameter surface of said arched tube being the ventral side thereof and the outer diameter surface being the dorsal side thereof, each said U-clip being removably clip-attached to said yoke structure over the dorsal side thereof to hold said arched tube in a substantially parallel laterally juxtaposed relationship to said yoke structure, with the central part of said arched tube elevated from said windshield with respect to the terminal ends thereof, said arched tube being adapted to flex and thereby change its arc of curvature in a plane perpendicular to said windshield in response to the flexing of said yoke structure in said plane during oscillation of said blade supporting assembly, and said tube having a plurality of apertures therein on the ventral side thereof for directing washing fluid as fed thereto toward said windshield at a position adjacent said wiper blade during said oscillation.

2. In the apparatus of claim 1, the improvement wherein said resiliently flexible plastic tube and said U-clip attached to each end portion of said plastic tube consist of a single unitary structure of plastic material.

3. In the apparatus of claim 1, the improvement wherein said flexible conduit means is connected to said windshield spraying washer at a location intermediate the ends of the resiliently flexible plastic tube forming said washer.

4. In the apparatus of claim 1, the improvement wherein said flexible conduit means is oriented in substantial alignment along said oscillating wiper arm, and fastening means for holding said flexible conduit in said alignment.

5. In the apparatus of claim 4, the improvement wherein the fastening means consists essentially of at least one loop member encircling both said conduit means and said wiper arm.

6. In a windshield cleaning apparatus comprising an elongated wiper blade for wiping the windshield, a wiper blade supporting assembly including a yoke structure connected to an oscillating wiper arm, said yoke structure being arched in a plane substantially perpendicular to the windshield, with the outer surface of said yoke structure most remote from said windshield being the exposed dorsal side thereof, both said wiper blade and said blade supporting assembly being flexible in said plane, a windshield spraying washer, means for mounting said washer for oscillation with said blade supporting assembly, and flexible conduit means connecting said washer to a source of washing liquid for feeding washing liquid to said washer, the improvement wherein said windshield spraying washer and said mounting means for the same consist of a single unitary structure in the form of a resiliently flexible rod-like plastic member, said rod-like plastic member being characterized by the fact that each end portion thereof is an inverted U-clip and forms said mounting means for said washer, and by the fact that the portion of said rod-like member intermediate said U-clip portions is tubular and forms said washer, said tubular portion being arched in an arc of a diameter greater than about 1 foot and less than 20 feet, with the inner diameter surface of said arched tubular portion being the ventral side thereof and the outer diameter surface being the dorsal side thereof, each said U-clip portion consisting essentially of a dorsally-directed stretch of said rod-like member at the substantial terminus of said tubular intermediate portion, a laterally directed stretch from the most dorsally extending part of said dorsally directed stretch, and a ventrally directed stretch from the most laterally extending part of said laterally directed stretch, with said laterally directed stretch of each said U-clip portion extending laterally from the same side of said tubular intermediate portion, said dorsally directed stretch and ventrally directed stretch forming opposing legs of the U-clip portion at each end, said opposing legs serving as pinching members, each said U-clip portion being removably clip-attached to said yoke structure over the dorsal side thereof to hold said arched tubular intermediate portion of said rod-like member in a substantially parallel laterally juxtaposed relationship to said yoke structure, with the central part of said arched tubular portion elevated from said windshield with respect to the terminal ends thereof, said arched tubular portion being adapted to flex and thereby change its arc of curvature in a plane perpendicular to said windshield in response to the flexing of said yoke structure in said plane during oscillation of said blade supporting assembly, and said tubular intermediate portion having a plurality of apertures therein on the ventral side thereof for directing washing liquid as fed thereto toward said windshield at a position adjacent said wiper blade during said oscillation.

7. In the apparatus of claim 6, the improvement wherein said flexible conduit means is connected to said windshield spraying washer at a location intermediate the terminal ends of said rod-like tubular portion forming said washer.

8. In the apparatus of claim 7, the improvement wherein said flexible conduit means is oriented in substantial alignment along said oscillating wiper arm, and fastening means for holding said flexible conduit in said alignment.

9. In the apparatus of claim 8, the improvement wherein said fastening means consists essentially of at least one loop member encircling both said conduit means and said wiper arm, said loop member consisting essentially of a flat band of flexible material with a slot aperture opening near one end thereof and through which the other end of said band is drawn to form said loop member.

* * * * *